US012536945B2

(12) United States Patent
Kim et al.

(10) Patent No.: US 12,536,945 B2
(45) Date of Patent: Jan. 27, 2026

(54) DISPLAY DEVICE

(71) Applicants: Samsung Display Co., LTD., Yongin-si (KR); UNIST(ULSAN NATIONAL INSTITUTE OF SCIENCE AND TECHNOLOGY), Ulsan (KR)

(72) Inventors: Hyosun Kim, Yongin-si (KR); Oh-Sang Kwon, Ulsan (KR); Seonggyu Choe, Ulsan (KR); Chang Yeong Han, Ulsan (KR); Min-Kyung Kim, Yongin-si (KR); Youra Kim, Yongin-si (KR); Hyungsuk Hwang, Yongin-si (KR); Eunjung Lee, Yongin-si (KR)

(73) Assignees: SAMSUNG DISPLAY CO., LTD., Gyeonggi-Do (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 44 days.

(21) Appl. No.: 18/423,665

(22) Filed: Jan. 26, 2024

(65) Prior Publication Data

US 2024/0274060 A1 Aug. 15, 2024

(30) Foreign Application Priority Data

Feb. 9, 2023 (KR) ........................ 10-2023-0017605

(51) Int. Cl.
*G09G 3/20* (2006.01)
*G09G 3/3233* (2016.01)
*G09G 3/3275* (2016.01)

(52) U.S. Cl.
CPC ......... *G09G 3/2096* (2013.01); *G09G 3/2007* (2013.01); *G09G 3/3233* (2013.01);
(Continued)

(58) Field of Classification Search
CPC .. G09G 3/2096; G09G 3/2007; G09G 3/3233; G09G 3/3275; G09G 2300/0819;
(Continued)

(56) References Cited

U.S. PATENT DOCUMENTS

2014/0104255 A1* 4/2014 Chen ........................ G09G 3/36 345/94
2021/0193064 A1* 6/2021 Piao ..................... G09G 3/3614
(Continued)

*Primary Examiner* — Ke Xiao
*Assistant Examiner* — Jennifer L Zubajlo
(74) *Attorney, Agent, or Firm* — CANTOR COLBURN LLP

(57) ABSTRACT

A display device includes: a display panel including a plurality of pixels; and a panel driver that drives the display panel at a target refresh rate different from a previous refresh rate. The panel driver includes: a comparator which compares a difference value between the previous refresh rate and the target refresh rate with a reference value generated by multiplying the previous refresh rate by a predetermined reference percentage; and a determiner which determines a final count of at least one compensation frame to be inserted between a previous driving frame operating at the previous refresh rate and a target driving frame operating at the target refresh rate when the difference value is not less than the reference value, where the final count is a total number of the at least one compensation frame, and a natural number.

20 Claims, 12 Drawing Sheets

(52) U.S. Cl.
CPC ... *G09G 3/3275* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2330/028* (2013.01); *G09G 2340/0435* (2013.01)

(58) Field of Classification Search
CPC ... G09G 2300/0842; G09G 2300/0861; G09G 2310/08; G09G 2320/0247; G09G 2330/028; G09G 2340/0435
See application file for complete search history.

(56) References Cited

U.S. PATENT DOCUMENTS

| | | | | |
|---|---|---|---|---|
| 2022/0093048 | A1* | 3/2022 | Lee | G09G 3/3275 |
| 2023/0104328 | A1* | 4/2023 | Kim | G09G 3/2096 345/204 |
| 2024/0038137 | A1* | 2/2024 | Kim | G09G 3/2096 |
| 2024/0249661 | A1* | 7/2024 | Jin | G09G 3/32 |

* cited by examiner

DISPLAY DEVICE

This application claims priority to Korean Patent Application No. 10-2023-0017605, filed on Feb. 9, 2023, and all the benefits accruing therefrom under 35 U.S.C. § 119, the content of which in its entirety is herein incorporated by reference.

BACKGROUND

Embodiments of the present disclosure described herein relate to a display device, and more particularly, relate to a display device capable of improving image quality.

A light emitting display device among display devices displays an image by using a light emitting diode that generates light through the recombination of electrons and holes. The light emitting display device has a fast response speed and operates with low power consumption.

The light emitting display device includes pixels connected to data lines and scan lines. Each of the pixels generally includes a light emitting diode, and a circuit unit for controlling the amount of current flowing to the light emitting diode. In response to a data signal, the circuit unit may control the amount of current that flows from a terminal, to which a first driving voltage is applied, to a terminal, to which a second driving voltage is applied, via the light emitting diode. In this case, light of predetermined luminance is generated to correspond to the amount of current flowing through the light emitting diode.

SUMMARY

Embodiments of the present disclosure provide a display device that is capable of improving image quality when operating in a variable frequency mode.

According to an embodiment, a display device includes a display panel including a plurality of pixels and a panel driver which drives the display panel at a target refresh rate different from a previous refresh rate. The panel driver includes: a comparator which compares a difference value between the previous refresh rate and the target refresh rate with a reference value generated by multiplying the previous refresh rate by a predetermined reference percentage, and a determiner which determines a final count of at least one compensation frame to be inserted between a previous driving frame operating at the previous refresh rate and a target driving frame operating at the target refresh rate when the difference value is not less than the reference value, where the final count is a total number of the at least one compensation frame, and a natural number.

According to an embodiment, a display device includes: a display panel including a plurality of pixels, a data driver which outputs data signals to the display panel, and a driving controller which controls driving of the data driver. The driving controller is configured to receive an input image signal at a target refresh rate different from a previous refresh rate. The driving controller includes: a comparator that compares a difference value between the previous refresh rate and the target refresh rate with a reference value generated by multiplying the previous refresh rate by a predetermined reference percentage, an initial count setting unit which compares a predetermined flashing threshold with flashing information and sets an initial count of at least one compensation frame depending on a result of the comparison between the predetermined flashing threshold and the flashing information when the difference value is not less than the reference value, and a final count setting unit which compares the initial count with a predetermined count threshold and adjusts the initial count to a final count depending on a result of the comparison between the initial count and the predetermined count threshold, where the final count is a total number of the at least one compensation frame, and a natural number.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
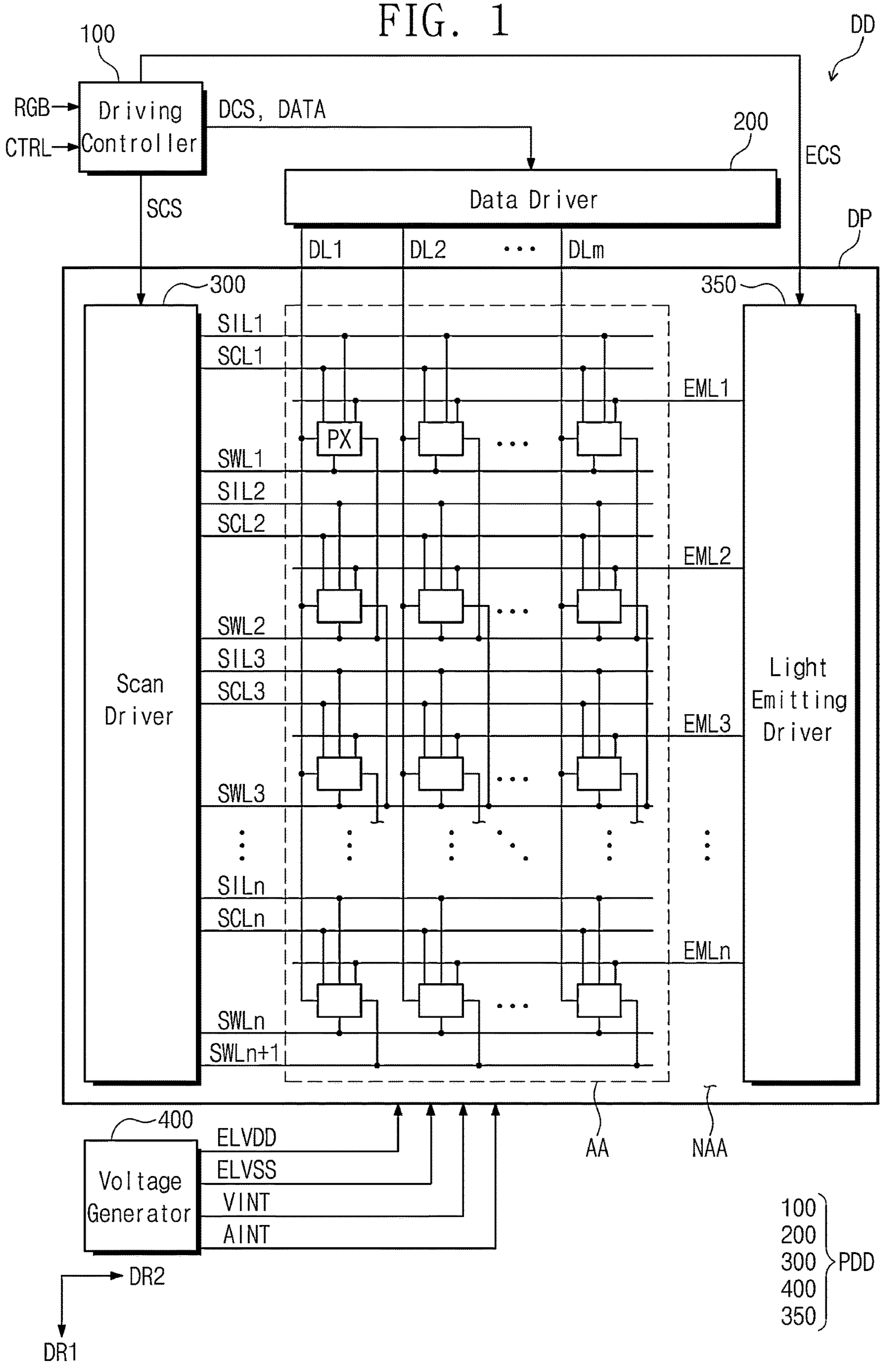
FIG. 1 is a block diagram of a display device, according to an embodiment of the present disclosure.

In the specification, the expression that a first component (or region, layer, part, portion, etc.) is “on”, “connected with”, or “coupled with” a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression “and/or” includes one or more combinations which associated components are capable of defining.

Although the terms “first”, “second”, etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present disclosure will be described with reference to accompanying drawings.

FIG. 1 is a block diagram of a display device, according to an embodiment of the present disclosure.

Referring to FIG. 1, a display device DD includes a display panel DP and a panel driver PDD that drives the display panel DP. In an embodiment of the present disclosure, the panel driver PDD includes a driving controller 100, a data driver 200, a scan driver 300, a light emitting driver 350, and a voltage generator 400.

The driving controller 100 receives an input image signal RGB and a control signal CTRL from a host processor. According to an embodiment of the present disclosure, the host processor may be a graphic processing unit ("GPU"). The driving controller 100 generates image data DATA by converting a data format of the input image signal RGB in compliance with the specification for an interface with the data driver 200. The control signal CTRL may include a vertical synchronization signal, an input data enable signal, a master clock signal, and the like. The driving controller 100 generates a first driving control signal SCS, a second driving control signal DCS, and a third driving control signal ECS based on the control signal CTRL.

The data driver 200 receives the second driving control signal DCS and the image data DATA from the driving controller 100. The data driver 200 converts the image data DATA into data signals and outputs the data signals to a plurality of data lines DL1 to DLm to be described later. The data signals refer to analog voltages corresponding to grayscale values of the image data DATA.

The scan driver 300 receives the first driving control signal SCS from the driving controller 100. The scan driver 300 may output scan signals to scan lines in response to the first driving control signal SCS.

The voltage generator 400 generates voltages to operate the display panel DP. In an embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, data lines DL1 to DLm, and pixels PX. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may overlap an active area AA. The initialization scan lines SIL1 to SILn, the compensation scan lines SCL1 to SCLn, the write scan lines SWL1 to SWLn+1, and the emission control lines EML1 to EMLn extend in the second direction DR2. The initialization scan lines SIL1 to SILn, the compensation scan lines SCL1 to SCLn, the write scan lines SWL1 to SWLn+1, and the emission control lines EML1 to EMLn are arranged spaced from one another in the first direction DR1. The data lines DL1 to DLm extend in the first direction DR1 and are arranged spaced from one another in the second direction DR2.

The plurality of pixels PX are electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected with four scan lines. In an embodiment, for example, as illustrated in FIG. 1, the first row of pixels may be connected to the first initialization scan line SIL1, the first compensation scan line SCL1, and the first and second write scan lines SWL1 and SWL2. Furthermore, the second row of pixels may be connected to the second initialization scan line SIL2, the second compensation scan line SCL2, and the second and third write scan lines SWL2 and SWL3. However, the number of scan lines connected to each of the pixels PX is not limited to thereto and may be variously changed. Alternatively, each of the plurality of pixels PX may be electrically connected to five scan lines. In this case, the display panel DP may further include black scan lines.

The scan driver 300 may be disposed in an inactive area NAA of the display panel DP. The scan driver 300 receives the first driving control signal SCS from the driving controller 100. In response to the first driving control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1. The circuit configuration and operation of the scan driver 300 will be described in detail later.

The light emitting driver 350 receives the third driving control signal ECS from the driving controller 100. The light emitting driver 350 may output emission control signals to the emission control lines EML1 to EMLn in response to the third driving control signal ECS. Alternatively, the scan driver 300 may be connected to the emission control lines EML1 to EMLn. In this case, the scan driver 300 may output emission control signals to the emission control lines EML1 to EMLn.

Each of the plurality of pixels PX includes a light emitting element ED (see FIG. 2) and a pixel circuit unit PXC (see FIG. 2) for controlling the emission of the light emitting element ED. The pixel circuit unit PXC may include a plurality of transistors and a capacitor. The scan driver 300 and the light emitting driver 350 may include transistors formed through the same process as the pixel circuit unit PXC.

Each of the plurality of pixels PX receives the first driving voltage ELVDD, the second driving voltage ELVSS, the first initialization voltage VINT, and the second initialization voltage AINT from the voltage generator 400.

Figure 2:
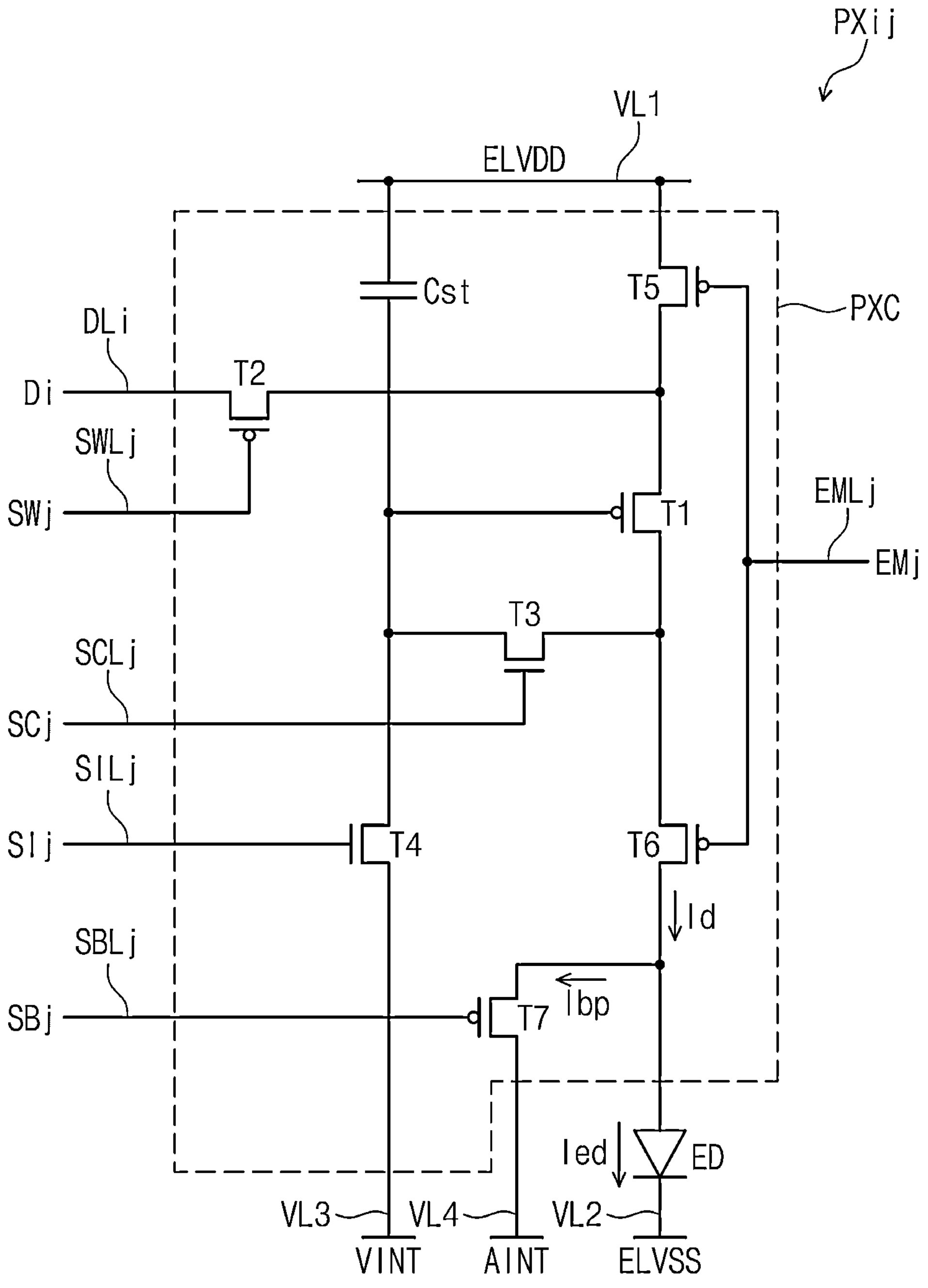
FIG. 2 is a circuit diagram of a pixel, according to an embodiment of the present disclosure.
Figure 3A:
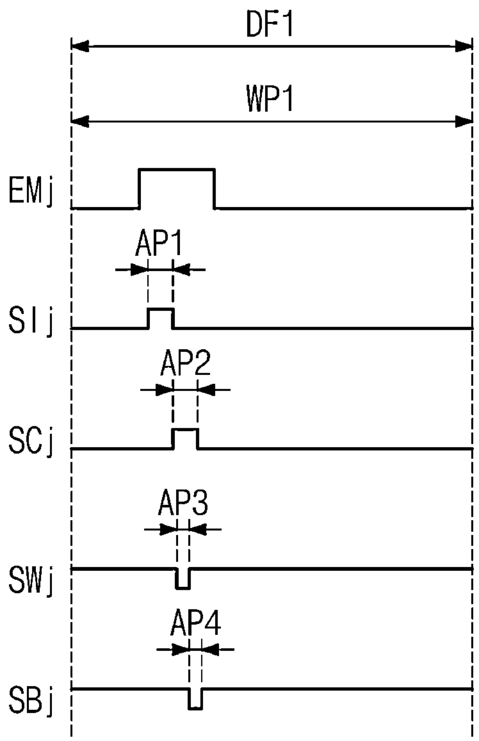
FIG. 3A is a timing diagram of a pixel operating at a first operating frequency in a variable frequency mode, according to an embodiment of the present disclosure.
Figure 3B:
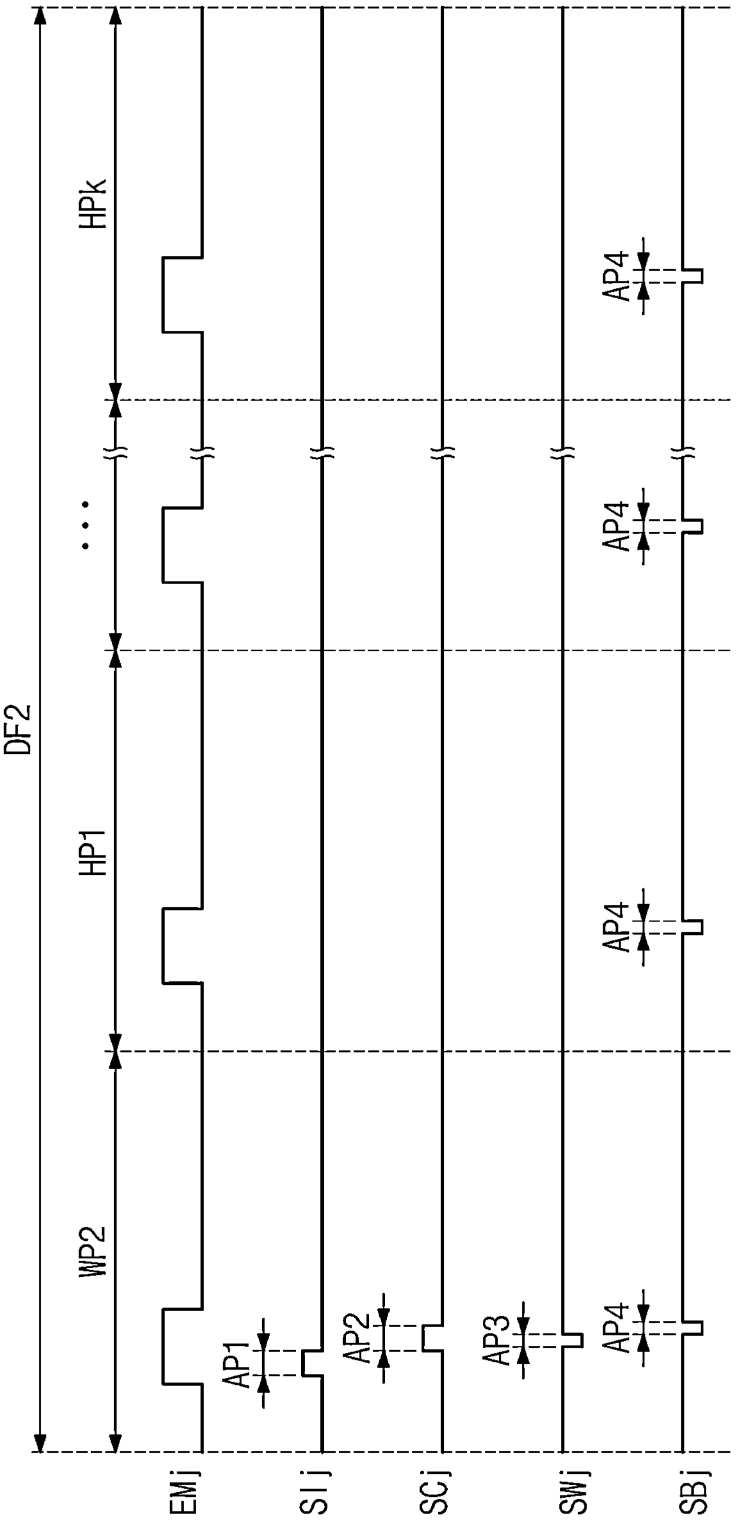
FIG. 3B is a timing diagram of a pixel operating at a second operating frequency in a variable frequency mode, according to an embodiment of the present disclosure.

FIG. 2 is a circuit diagram of a pixel, according to an embodiment of the present disclosure. FIG. 3A is a timing diagram of a pixel operating at a first operating frequency in a variable frequency mode, according to an embodiment of the present disclosure. FIG. 3B is a timing diagram of a pixel operating at a second operating frequency in a variable frequency mode, according to an embodiment of the present disclosure.

An equivalent circuit diagram of one pixel PXij among the plurality of pixels PX illustrated in FIG. 1 is illustrated in FIG. 2. Because each of the plurality of pixels PX has the same circuit structure, a detailed description of the remaining pixels PX will be replaced with a description of a circuit structure of the pixel PXij.

Referring to FIG. 2, the pixel PXij is connected to an i-th data line DLi (hereinafter referred to as a "data line") of the data lines DL1 to DLm and a j-th emission control line EMLj (hereinafter referred to as an "emission control line") among the emission control lines EML1 to EMLn. The pixel PXij is connected to a j-th initialization scan line SILj (hereinafter, referred to as an "initialization scan line") among the initialization scan lines SIL1 to SILn, a j-th write scan line SWLj (hereinafter, referred to as a "write scan line") among the write scan lines SWL1 to SWLn+1, and a j-th black scan line SBLj (hereinafter, referred to as a "black scan line"). Moreover, the pixel PXij is connected to a j-th compensation scan line SCLj (hereinafter, referred to as a "compensation scan line") among the compensation scan lines SCL1 to SCLn. Alternatively, the pixel PXij may be connected to a (j+1)-th write scan line instead of the j-th black scan line SBLj.

The pixel PXij includes the light emitting element ED and the pixel circuit unit PXC. The light emitting element ED may include a light emitting diode. The light emitting diode may include an organic light emitting material, an inorganic light emitting material, quantum dots, and quantum rods as a light emitting layer.

The pixel circuit unit PXC includes first to seventh transistors T1, T2, T3, T4, T5, T6, and T7 and a single capacitor Cst. Each of the first to seventh transistors T1 to T7 may be a transistor having a low-temperature polycrystalline silicon ("LTPS") semiconductor layer. Some of the first to seventh transistors T1 to T7 may be P-type transistors, and the other(s) thereof may be N-type transistors. In an embodiment, for example, among the first to seventh transistors T1 to T7, the first, second, and fifth to seventh transistors T1, T2, and T5 to T7 are P-type transistors, and the third and fourth transistors T3 and T4 may be N-type transistors by using an oxide semiconductor as a semiconductor layer. However, a configuration of the pixel circuit unit PXC according to the present disclosure is not limited to an embodiment illustrated in FIG. 2. The pixel circuit unit PXC illustrated in FIG. 2 is only one example, and the configuration of the pixel circuit unit PXC may be modified and carried out. In an embodiment, for example, all of the first to seventh transistors T1 to T7 may be P-type transistors or N-type transistors.

The initialization scan line SILj may transmit the j-th initialization scan signal SIj (hereinafter referred to as an "initialization scan signal") to the pixel PXij, and the compensation scan line SCLj may transmit the j-th compensation scan signal SCj (hereinafter referred to as a "compensation scan signal") to the pixel PXij. The write scan line SWLj may transmit the j-th write scan signal SWj (hereinafter referred to as a "write scan signal") to the pixel PXij, and the black scan line SBLj may transmit the j-th black scan signal SBj (hereinafter referred to as a "black scan signal") to the pixel PXij. The emission control line EMLj may transmit the j-th emission control signal EMj (hereinafter referred to as an "emission control signal") to the pixel PXij. The data line DLi transmits a data signal Di to the pixel PXij. The data signal Di may have a voltage level corresponding to the grayscale of the corresponding input image signal among the input image signal RGB entered into the display device DD (see FIG. 1). First to fourth driving voltage lines VL1, VL2, VL3, and VL4 may transmit the first driving voltage ELVDD, the second driving voltage ELVSS, the first initialization voltage VINT, and the second initialization voltage AINT to the pixel PXij, respectively.

The first transistor T1 includes a first electrode connected with the first driving voltage line VL1 through the fifth transistor T5, a second electrode electrically connected with an anode of the light emitting element ED through the sixth transistor T6, and a gate electrode connected with one end of the capacitor Cst. The first transistor T1 may receive the data signal Di transmitted through the data line DLi depending on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the write scan line SWLj. The second transistor T2 may be turned on in response to the write scan signal SWj transferred through the write scan line SWLj and then may transfer the data signal Di transferred from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj received through the compensation scan line SCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the driving third voltage line VL3 to which the first initialization voltage VINT is delivered, and a gate electrode connected to the initialization scan line SILj. The fourth transistor T4 may be turned on in response to the initialization scan signal SIj delivered through the initialization scan line SILj such that the first initialization voltage VINT is delivered to the gate electrode of the first transistor T1. As such, a voltage of the gate electrode of the first transistor T1 may be initialized. This operation may be referred to as an "initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 are simultaneously turned on in response to the emission control signal EMj received through the emission control line EMLj. The first driving voltage ELVDD applied through the fifth transistor T5 thus turned on may be compensated through the diode-connected first transistor T1 and then may be transmitted to the light emitting element ED.

The seventh transistor T7 includes a first electrode connected to the second electrode of the sixth transistor T6, a second electrode connected to the fourth driving voltage line VL4, to which the second initialization voltage AINT is transmitted, and a gate electrode connected to the black scan line SBLj.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2, to which the second driving voltage ELVSS is transmitted.

Referring to FIGS. 2 and 3A, the display panel DP (see FIG. 1) has a first operating frequency (or a reference frequency) and may display an image during a first driving frame DF1. The first driving frame DF1 may include a first write frame WP1. In a variable frequency mode, the operating frequency of the display panel DP may be varied. In an embodiment, for example, the display panel DP may have a second operating frequency (or a second refresh rate) and may display an image during a second driving frame DF2. In an embodiment of the present disclosure, the first operating frequency may be higher than the second operating frequency. The second driving frame DF2 may include a second write frame WP2 and 'k' holding frames HP1 to HPk. Here, 'k' may be an integer of 1 or more. The second write frame WP2 may have the same duration as the duration of the first write frame WP1.

The plurality of scan signals SIj, SCj, SWj, and SBj may be activated during the first and second write frames WP1 and WP2. In detail, the initialization scan signal SIj includes a first active period AP1 having a high level within the first and second write frames WP1 and WP2. The compensation scan signal SCj includes a second active period AP2 having a high level within the first and second write frames WP1 and WP2. The write scan signal SWj includes a third active period AP3 having a low level within the first and second write frames WP1 and WP2. The black scan signal SBj includes a fourth active period AP4 having a low level within the first and second write frames WP1 and WP2. In an embodiment of the present disclosure, in addition to the first and second write frames WP1 and WP2, the black scan signal SBj may further include the fourth active period AP4 having a low level within the 'k' holding frames HP1 to HPk. That is, some scan signals SIj, SCj, and SWj among the plurality of scan signals SIj, SCj, SWj, and SBj may have the same frequency as the corresponding driving frame, and the remaining scan signal SBj may have the same frequency as the reference frequency.

The emission control signal EMj may be activated in the first and second write frames WP1 and WP2 and the 'k' holding frames HP1 to HPk. That is, the emission control signal EMj may have the same frequency as the reference frequency.

When the initialization scan signal SIj having a high level is provided through the initialization scan line SILj during the first active period AP1, the fourth transistor T4 is turned on in response to the initialization scan signal SIj having the high level. The first initialization voltage VINT is delivered to the gate electrode of the first transistor T1 through the turned-on fourth transistor T4, and the gate electrode of the first transistor T1 is initialized by the first initialization voltage VINT.

Next, when the compensation scan signal SCj having a high level is supplied through the compensation scan line SCLj during the second active period AP2, the third transistor T3 is turned on. During the second active period AP2, the first transistor T1 is diode-connected by the third transistor T3 turned on and is forward-biased. The second active period AP2 of the compensation scan signal SCj may not overlap the first active period AP1 of the initialization scan signal SIj. Moreover, the first active period AP1 of the initialization scan signal SIj may precede the second active period AP2 of the compensation scan signal SCj.

In an embodiment of the present disclosure, the second active period AP2 of the compensation scan signal SCj is defined as a period in which the compensation scan signal SCj has a high level. The first active period AP1 of the initialization scan signal SIj is defined as a period in which the initialization scan signal SIj has a high level. When the third and fourth transistors T3 and T4 are P-type transistors, the second active period AP2 of the compensation scan signal SCj may be defined as a period in which the compensation scan signal SCj has a low level, and the first active period AP1 of the initialization scan signal SIj may be defined as a period in which the initialization scan signal SIj has a low level.

The second active period AP2 may overlap the third active period AP3 in which the write scan signal SWj is generated at a low level. During the third active period AP3, the second transistor T2 is turned on by the write scan signal SWj having the low level. Then, a compensation voltage "Di-Vth" obtained by reducing the voltage of the data signal Di supplied from the data line DLi by the threshold voltage Vth of the first transistor T1 is applied to the gate electrode of the first transistor T1. That is, the potential of the gate electrode of the first transistor T1 may be the compensation voltage "Di-Vth".

The first driving voltage ELVDD and the compensation voltage "Di-Vth" may be applied to opposite ends of the capacitor Cst, respectively, and charges corresponding to a voltage difference between the opposite ends of the capacitor Cst may be stored in the capacitor Cst.

Afterward, during the fourth active period AP4, the seventh transistor T7 may be turned on by receiving the black scan signal SBj having the low level through the black scan line SBLj. A portion of the driving current Id may be drained through the seventh transistor T7 as a bypass current Ibp.

In the case where the pixel PXij displays a black image, when the light emitting element ED emits light even though the minimum driving current of the first transistor T1 flows as the driving current Id, the pixel PXij may not normally display a black image. Accordingly, the seventh transistor T7 in the pixel PXij according to an embodiment of the present disclosure may drain (or disperse) a part of the minimum driving current of the first transistor T1 to a current path, which is different from a current path to the light emitting element ED, as the bypass current Ibp. Here, the minimum driving current of the first transistor T1 means the current flowing into the first transistor T1 under the condition that the first transistor T1 is turned off because the gate-source voltage Vgs of the first transistor T1 is less than the threshold voltage Vth. As the minimum driving current (e.g., a current of 10 picoamperes (pA) or less) flowing to the first transistor T1 is transferred to the light emitting element ED under the condition that the first transistor T1 is turned off, an image of a black gray scale is displayed. When the pixel PXij displays a black image, the bypass current Ibp has a relatively large influence on the minimum driving current. On the other hand, when the pixel PXij displays an image such as a normal image or a white image, the bypass current Ibp has little effect on the driving current Id. Accordingly, when a black image is displayed, a current (i.e., the light emitting current Ied) that corresponds to a result of subtracting the bypass current Ibp flowing through the seventh transistor T7 from the driving current Id is provided to the light emitting element ED, and thus a black image may be clearly displayed. Accordingly, the pixel PXij may implement an accurate black grayscale image by using the seventh transistor T7, and thus a contrast ratio may be improved.

Next, the emission control signal EMj supplied from the emission control line EMLj is changed from a high level to a low level. The fifth transistor T5 and the sixth transistor T6 are turned on in response to the emission control signal EMj having the low level. In this case, the driving current Id according to a voltage difference between the gate voltage of the gate electrode of the first transistor T1 and the first driving voltage ELVDD is generated and supplied to the light emitting element ED through the sixth transistor T6, and the light emitting current Ied flows through the light emitting element ED.

During the 'k' holding frames HP1 to HPk, the light emitting element ED may maintain the light emitting current Ied flowing to the light emitting element ED during the first and second write frames WP1 and WP2, and in each of the 'k' holding frames HP1 to HPk, the displayed image may be maintained during the first and second write frames WP1 and WP2.

Figure 4A:
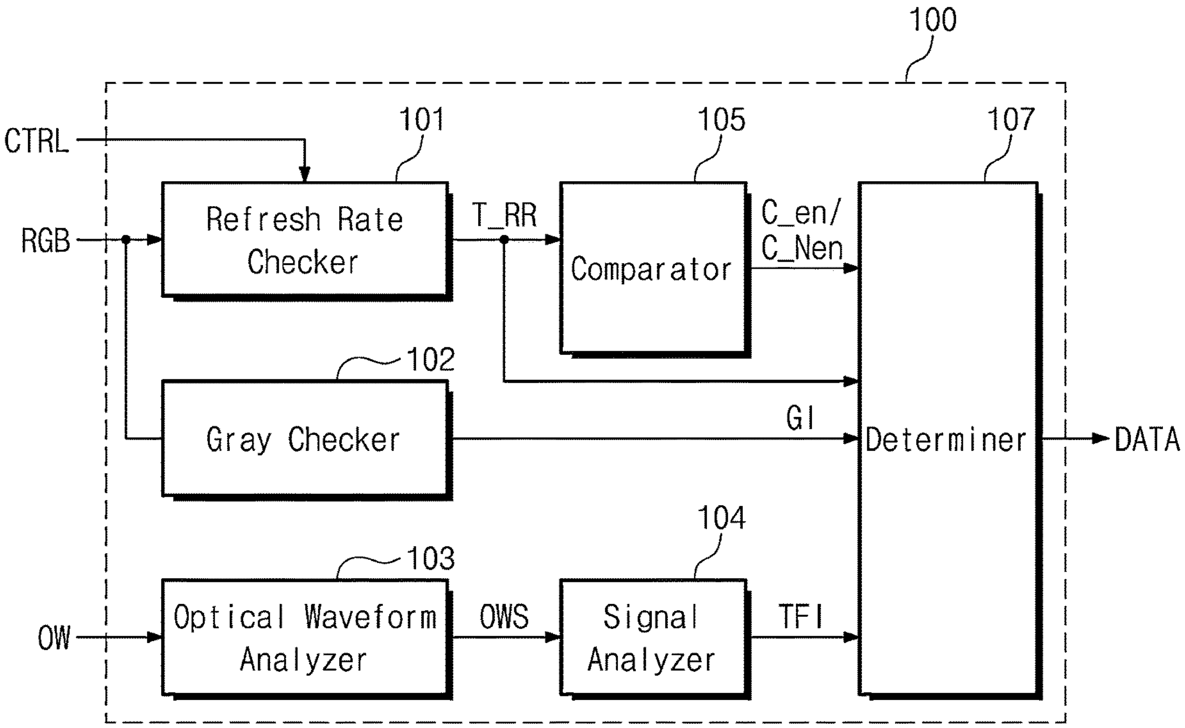
FIG. 4A is a block diagram of a driving controller, according to an embodiment of the present disclosure.
Figure 4B:
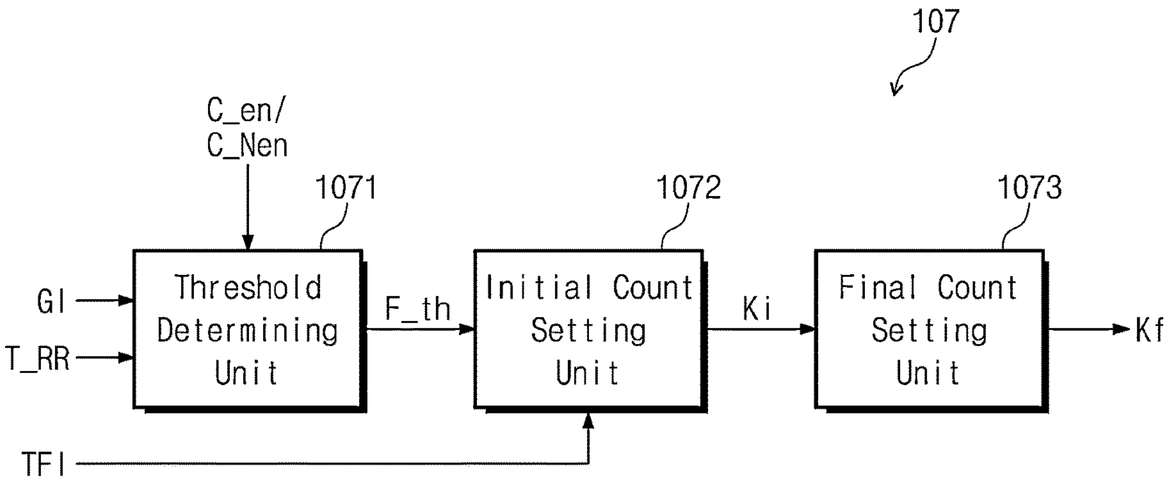
FIG. 4B is a block diagram of the determiner shown in FIG. 4A.
Figure 4C:
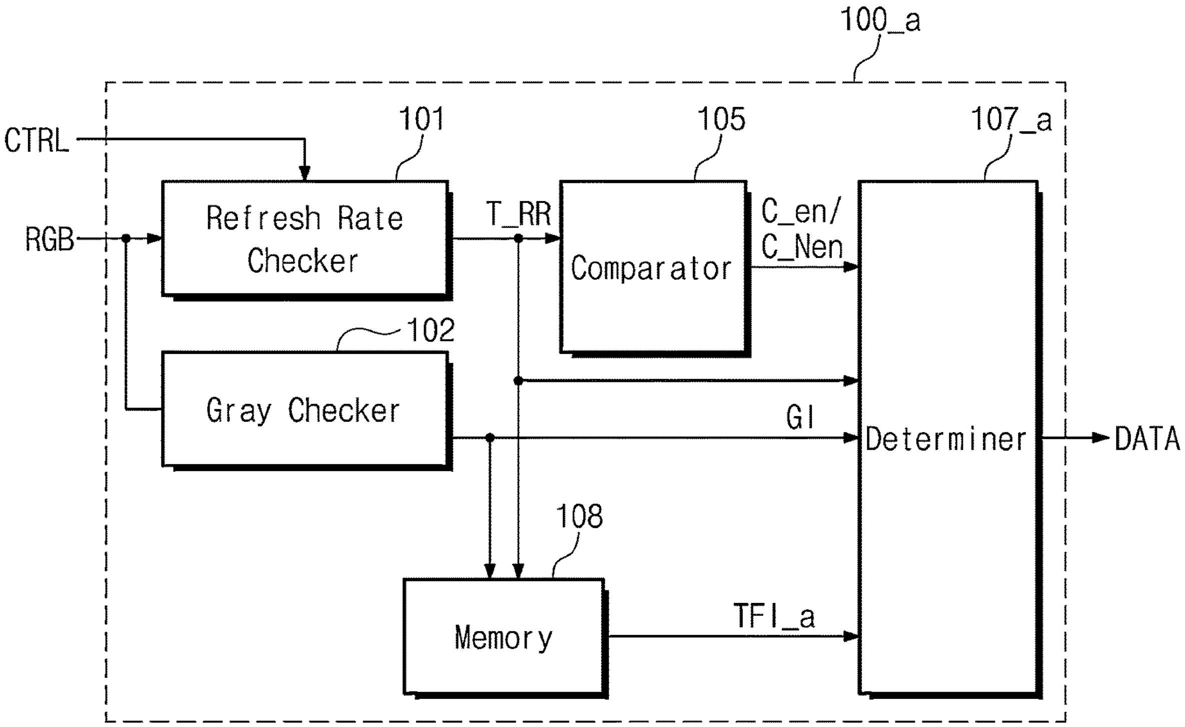
FIG. 4C is a block diagram of a driving controller, according to an embodiment of the present disclosure.
Figure 5:
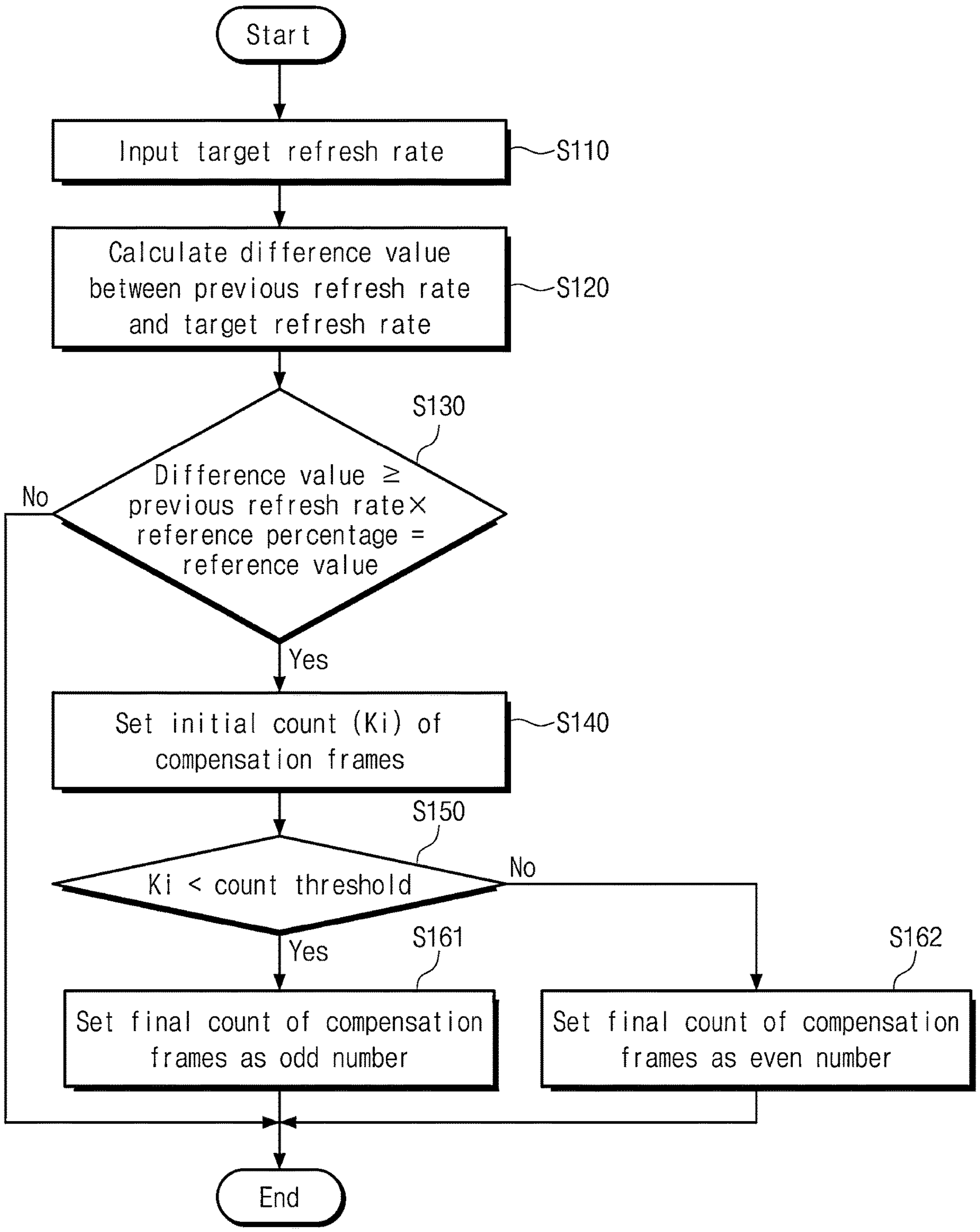
FIG. 5 is a flowchart illustrating an operation of a driving controller, according to an embodiment of the present disclosure.

FIG. 4A is a block diagram of a driving controller, according to an embodiment of the present disclosure. FIG. 4B is a block diagram of the determiner shown in FIG. 4A. FIG. 4C is a block diagram of a driving controller, according to an embodiment of the present disclosure. FIG. 5 is a flowchart illustrating an operation of a driving controller, according to an embodiment of the present disclosure.

Referring to FIGS. 4A and 5, the driving controller 100 includes a refresh rate checker (or checking circuit) 101, a gray checker (or checking circuit) 102, a comparator 105, and a determiner 107.

The refresh rate checker 101 may receive the input image signal RGB and the control signal CTRL from a host processor. The input image signal RGB may include image information about the displayed image, and the refresh rate checker 101 may calculate a current refresh rate based on the input image signal RGB and the control signal CTRL. The refresh rate checker 101 may calculate a frequency, at which the input image signal RGB is received, as the current refresh rate and then may provide the comparator 105 with the current refresh rate as a target refresh rate T_RR (S110).

In an embodiment, the comparator 105 may store a previous refresh rate for a previous image in advance, for example, before the target refresh rate is calculated. The comparator 105 may calculate a difference value between the previous refresh rate and the target refresh rate T_RR provided by the refresh rate checker 101 (S120). Furthermore, the comparator 105 may compare the difference value with a reference value generated by multiplying the previous refresh rate by a preset reference percentage (S130). When the difference value is greater than or equal to the reference value, the comparator 105 may provide a compensation activation signal C_en to the determiner 107. On the other hand, when the difference value is smaller than the reference value, the comparator 105 may provide a compensation inactivation signal C_Nen to the determiner 107.

The gray checker 102 may calculate grayscale information GI of the input image signal RGB, for example, the number of input image signals having a predetermined reference grayscale.

The driving controller 100 further includes an optical waveform analyzer 103 and a signal analyzer 104. The optical waveform analyzer 103 may generate an optical waveform signal OWS calculated based on an optical waveform OW measured from an image displayed on the display panel DP (see FIG. 1). A signal analyzer 104 may determine whether temporary flashing occurs, by using the optical waveform signal OWS and may calculate information TFI (i.e. flashing information) about temporary flashing. In an embodiment, for example, the flashing information TFI may include the magnitude of temporary flashing.

The determiner 107 may receive the compensation activation signal C_en (or the compensation inactivation signal C_Nen) from the comparator 105. Besides, the determiner 107 may receive the grayscale information GI, the flashing information TFI, and the target refresh rate T_RR and may determine whether to insert a compensation frame, and the number of compensation frames by using the grayscale information GI, the flashing information TFI, and the target refresh rate T_RR.

Referring to FIGS. 4A and 4B, the determiner 107 includes a threshold determining unit 1071, an initial count setting unit 1072, and a final count setting unit 1073. The threshold determining unit 1071 may receive the compensation activation signal C_en (or the compensation inactivation signal C_Nen) from the comparator 105. In an embodiment, for example, the threshold determining unit 1071 may be activated in response to the compensation activation signal C_en and may be deactivated in response to the compensation inactivation signal C_Nen. That is, when the difference value is equal to or greater than the reference value, the threshold determining unit 1071 may be activated. When the difference value is less than the reference value, the threshold determining unit 1071 may be deactivated.

In an embodiment of the present disclosure, when the difference value is less than the reference value, the determiner 107 may determine not to insert a compensation frame. That is, image quality delay may be preventing from occurring in a video by preventing a compensation frame from being unnecessarily inserted when there is no need to insert a compensation frame (i.e., when the difference value is less than the reference value).

The threshold determining unit 1071 may generate a flashing threshold F_th based on the grayscale information GI and the target refresh rate T_RR. The initial count setting unit 1072 may compare the flashing threshold F_th with the flashing information TFI and may set an initial count Ki of at least one compensation frame based on the comparison result (S140). Here, Ki may be a natural number greater than or equal to 1.

The final count setting unit 1073 may compare the initial count Ki with the predetermined count threshold N_th (S150). Here, N_th may be a natural number greater than or equal to 1. In an embodiment of the present disclosure, when the initial count Ki is less than the count threshold N_th, the final count setting unit 1073 may set a final count Kf of at least one compensation frames as an odd number (S161). When the initial count Ki is not less than the count threshold N_th, the final count setting unit 1073 may set the final count Kf of at least one compensation frames as an even number (S162). When Ki is 3 and the count threshold N_th is 5, the final count setting unit 1073 may output the initial count Ki as the final count Kf. On the other hand, when Ki is 4 and the count threshold N_th is 5, the final count setting unit 1073 may change the initial count Ki to 3, and may output 3 as the final count Kf. In an embodiment of the present disclosure, the count threshold N_th may be 4 or 5. However, the count threshold N_th is not limited thereto. In another embodiment, for example, the count threshold N_th may be set differently depending on a level of each of the previous refresh rate and the target refresh rate T_RR.

Each compensation frame may have a compensation refresh rate between the previous refresh rate and the target refresh rate T_RR. In an embodiment of the present disclosure, the compensation refresh rate may be set such that the difference value between the compensation refresh rate and the previous refresh rate is less than the reference value. That is, the driving controller 100 may output the image data DATA at a compensation refresh rate during a compensation frame.

FIGS. 4A and 4B illustrate a structure in which the driving controller 100 includes the optical waveform analyzer 103 and the signal analyzer 104, but the present disclosure is not limited thereto. Alternatively, a driving controller 100_*a* according to an embodiment of the present disclosure may include a memory 108 instead of the optical waveform analyzer 103 and the signal analyzer 104. The grayscale information GI and the target refresh rate T_RR may be provided to the memory 108. Flashing information TFI_a and the like may be stored in advance depending on the grayscale information GI and the target refresh rate T_RR.

A determiner 107_*a* may receive the flashing information TFI_a from the memory 108. The determiner 107_*a* may determine whether to insert compensation frames and the final count Kf of compensation frames based on the grayscale information GI, the flashing information TFI_a, and the target refresh rate T_RR.

Figure 6:
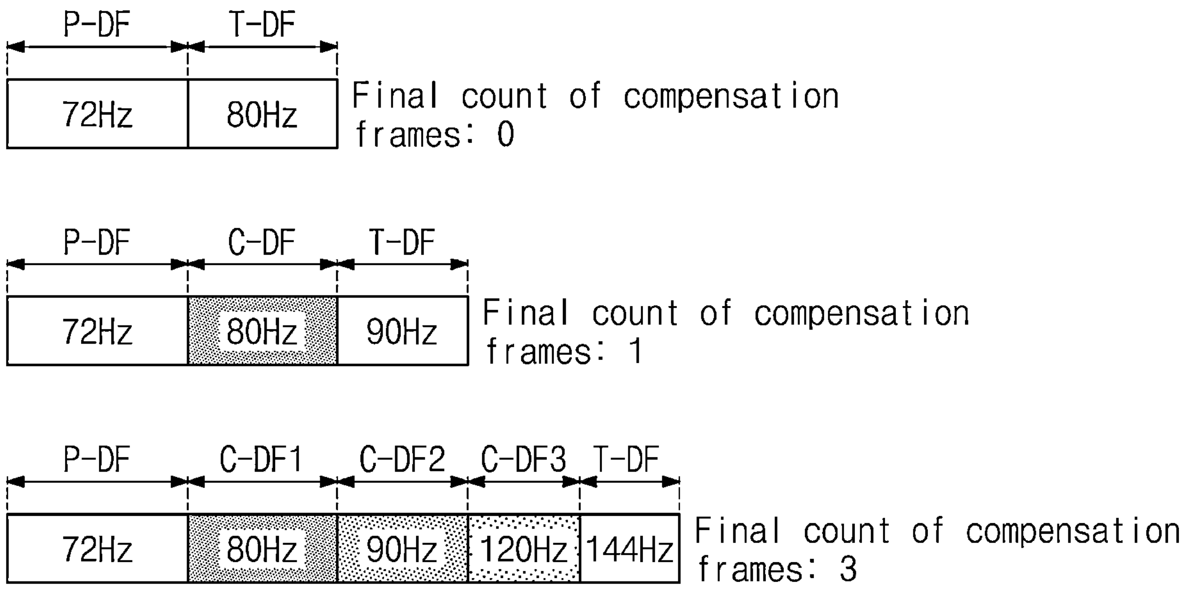
FIG. 6 is a diagram illustrating a previous refresh rate, a compensation refresh rate, and a target refresh rate, according to an embodiment of the present disclosure.

FIG. 6 is a diagram illustrating a previous refresh rate, a compensation refresh rate, and a target refresh rate, according to an embodiment of the present disclosure.

Referring to FIGS. 5 and 6, when a previous refresh rate of a previous driving frame P-DF is 72 Hz and a target refresh rate T_RR of a target driving frame T-DF is 80 Hz, a difference value between the previous refresh rate (i.e., 72 Hz) and the target refresh rate T_RR (i.e., 80 Hz) may be 8 Hz. In this case, a reference value may be calculated as 18 Hz by multiplying the previous refresh rate (i.e., 72 Hz) by a predetermined reference percentage (e.g., about 25%). Because the difference value is smaller than the reference value, the driving controller 100 (refer to FIG. 4A) may determine not to insert a compensation frame between the previous driving frame P-DF and the target driving frame T-DF. Accordingly, the target driving frame T-DF of the target refresh rate T_RR (i.e., 80 Hz) may be generated to be continuous to the previous driving frame P-DF.

In the meantime, when a previous refresh rate of the previous driving frame P-DF is 72 Hz and a target refresh rate of the target driving frame T-DF is 90 Hz, a difference value between the previous refresh rate (i.e., 72 Hz) and the target refresh rate T_RR (i.e., 90 Hz) may be 18 Hz. In this case, because the difference value is greater than or equal to the reference value, the driving controller 100 may determine to insert a compensation frame C-DF between the previous driving frame P-DF and the target driving frame T-DF. In an embodiment of the present disclosure, the driving controller 100 shows that the compensation refresh rate of the compensation frame C-DF is set to 80 Hz, but the present disclosure is not limited thereto. In another embodiment, for example, the compensation refresh rate may be variously varied within a range in which a difference value between a compensation refresh rate and a previous refresh rate is less than a reference value (i.e., 18 Hz). In addition, the final count Kf of compensation frames C-DF is 1, but the present disclosure is not limited thereto. In another embodiment, the final count Kf of compensation frames C-DF may be changed to two or more.

In the meantime, when a previous refresh rate of the previous driving frame P-DF is 72 Hz and a target refresh rate T_RR of the target driving frame T-DF is 144 Hz, a difference value between the previous refresh rate (i.e., 72 Hz) and the target refresh rate T_RR (i.e., 144 Hz) may be 72 Hz. In this case, because the difference value is greater than or equal to the reference value, the driving controller 100 may determine to insert compensation frames C-DF1, C-DF2, and C-DF3 between the previous driving frame P-DF and the target driving frame T-DF. In an embodiment of the present disclosure, the driving controller 100 may set the final count Kf of compensation frames C-DF1, C-DF2, and C-DF3 to three and may set the compensation refresh rates of the compensation frames C-DF1, C-DF2, and C-DF3 to 80 Hz, 90 Hz, and 120 Hz, respectively. However, the final count Kf of compensation frames C-DF1, C-DF2, and C-DF3 and the compensation refresh rates of the compensation frames C-DF1, C-DF2, and C-DF3 are not limited thereto and may be variously changed.

Figure 7A:
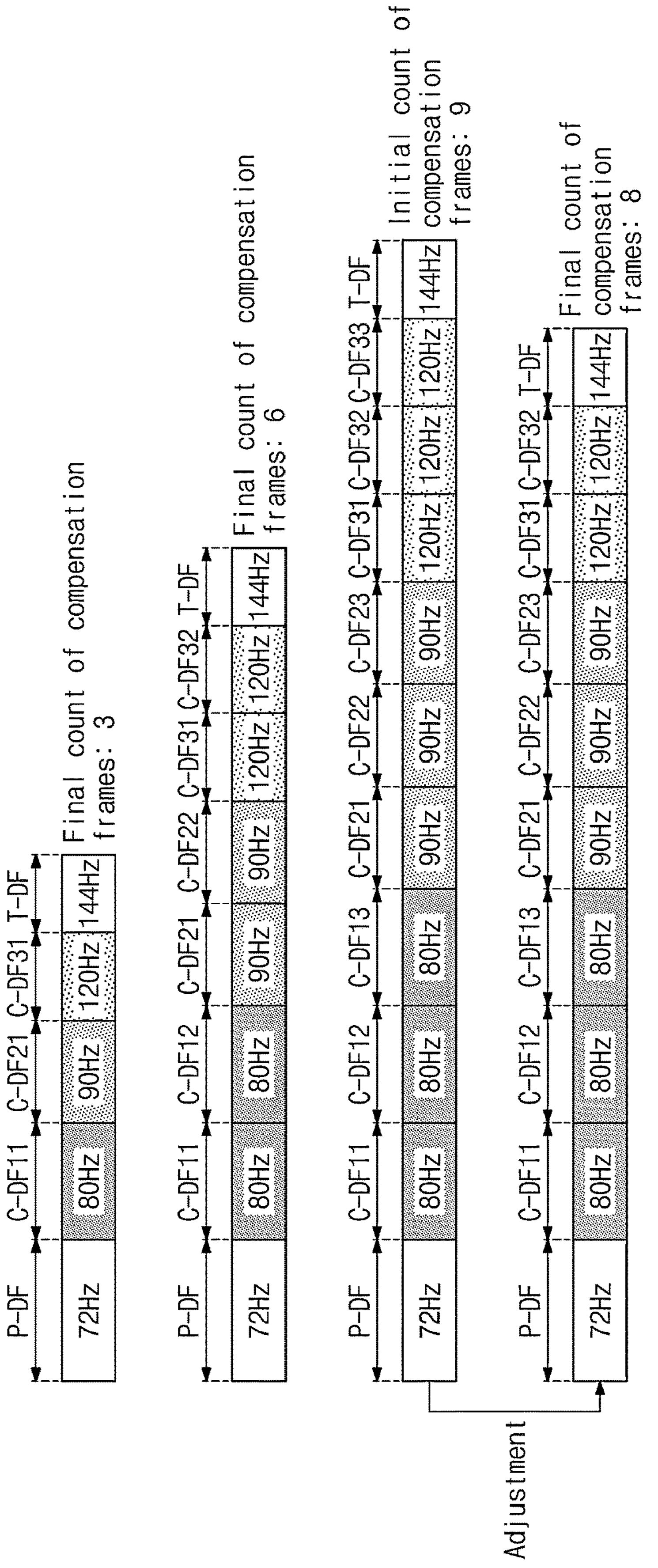
FIG. 7A is a diagram illustrating a process of adjusting the number of compensation frames, according to an embodiment of the present disclosure.
Figure 7B:
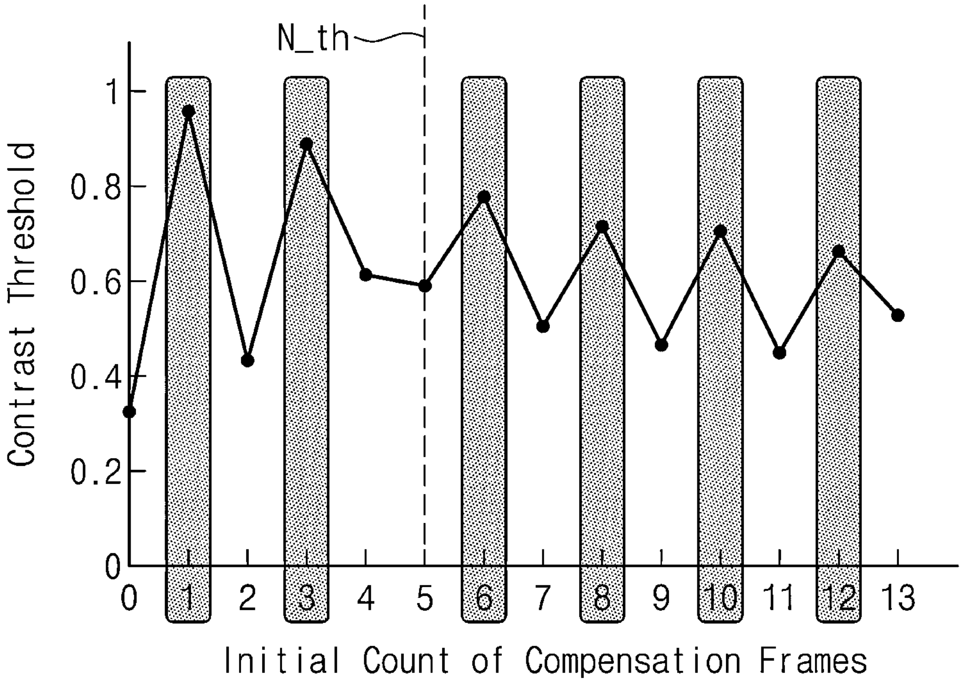
FIG. 7B is a diagram showing flashing levels according to the number of compensation frames, according to an embodiment of the present disclosure.

FIG. 7A is a diagram illustrating a process of adjusting the initial count of the compensation frames, according to an embodiment of the present disclosure. FIG. 7B is a diagram showing flashing levels according to the final count of compensation frames, according to an embodiment of the present disclosure.

Referring to FIGS. 4A, 4B, and 7A, when a previous refresh rate of the previous driving frame P-DF is 72 Hz and a target refresh rate T_RR of the target driving frame T-DF is 144 Hz, a difference value between the previous refresh rate (i.e., 72 Hz) and the target refresh rate T_RR (i.e., 144 Hz) may be 72 Hz. In this case, because the difference value is greater than or equal to a reference value (i.e., 18 Hz), the driving controller 100 may determine to insert compensation frames C-DF11, C-DF21, and C-DF31 between the previous driving frame P-DF and the target driving frame T-DF. In an embodiment of the present disclosure, the driving controller 100 may set the initial count Ki of compensation frames C-DF11, C-DF21, and C-DF31 to 3 and may set the compensation refresh rates of the compensation frames C-DF11, C-DF21, and C-DF31 to 80 Hz, 90 Hz, and 120 Hz, respectively.

The driving controller 100 may compare the initial count Ki of compensation frames C-DF11, C-DF21, and C-DF31 with the predetermined count threshold N_th. In an embodiment of the present disclosure, when the initial count Ki is 3 in the case where the count threshold N_th is set to 5, the final count Kf of compensation frames positioned between the previous driving frame P-DF and the target driving frame T-DF needs to be adjusted to an odd number. Here, because the initial count Ki of the compensation frames C-DF11, C-DF21, and C-DF31 is 3, which is already an odd number, the driving controller 100 may set the initial count Ki to the final count Kf without adjustment.

In an embodiment of the present disclosure, the driving controller 100 may determine to insert six compensation frames C-DF11, C-DF12, C-DF21, C-DF22, C-DF31, and C-DF32 between the previous driving frame P-DF and the target driving frame T-DF. Among the six compensation frames C-DF11, C-DF12, C-DF21, C-DF22, C-DF31, and C-DF32, the compensation refresh rate (or a first compensation refresh rate) of each of the compensation frames C-DF11 and C-DF12 (or first compensation frames) may be 80 Hz; the compensation refresh rate (or a second compensation refresh rate) of each of the compensation frames (or second compensation frames) C-DF21 and C-DF22 may be 90 Hz; and, the compensation refresh rate (or a third compensation refresh rate) of each of the compensation frames C-DF31 and C-DF32 (or third compensation frames) may be 120 Hz. The first compensation refresh rate (i.e., 80 Hz) may be set such that a difference value between the first compensation refresh rate (i.e., 80 Hz) and the previous refresh rate (i.e., 72 Hz) is equal to or less than the reference value (i.e., 18 Hz). Moreover, the second compensation refresh rate (i.e., 90 Hz) may be set such that a difference value (i.e., 10 Hz) between the second compensation refresh rate (i.e., 90 Hz) and the first compensation refresh rate (i.e., 80 Hz) is less than or equal to an additional reference value (i.e., 20 Hz) generated by multiplying the first compensation refresh rate (i.e., 80 Hz) by a reference percentage. The third compensation refresh rate (i.e., 120 Hz) may be set such that a difference value (i.e., 30 Hz) between the third compensation refresh rate (i.e., 120 Hz) and the second compensation refresh rate (i.e., 90 Hz) is less than or equal to an additional reference value (i.e., 30 Hz) generated by multiplying the second compensation refresh rate (i.e., 90 Hz) by a reference percentage.

The driving controller 100 may compare the initial count Ki of compensation frames C-DF11, C-DF12, C-DF21, C-DF22, C-DF31, and C-DF32 with the predetermined count threshold N_th. In an embodiment of the present disclosure, when the initial count Ki is 6 in the case where the count threshold N_th is set to 5, the final count Kf of compensation frames positioned between the previous driving frame P-DF and the target driving frame T-DF needs to be adjusted to an even number. Here, because the initial count Ki of the compensation frames C-DF11, C-DF12, C-DF21, C-DF22, C-DF31, and C-DF32 is 6, which is already an even number, the driving controller 100 may set the initial count Ki to the final count Kf without adjustment.

In an embodiment of the present disclosure, the driving controller 100 may determine to insert nine compensation frames C-DF11, C-DF12, C-DF13, C-DF21, C-DF22, C-DF23, C-DF31, C-DF32, and C-DF33 between the previous driving frame P-DF and the target driving frame T-DF. Among the nine compensation frames C-DF11, C-DF12, C-DF13, C-DF21, C-DF22, C-DF23, C-DF31, C-DF32, and C-DF33, the first compensation refresh rate of each of the first compensation frames C-DF11, C-DF12, and C-DF13 may be 80 Hz, the second compensation refresh rate of each of the second compensation frames C-DF21, C-DF22, and C-DF23 may be 90 Hz, and the third compensation refresh rate of each of the third compensation frames C-DF31, C-DF32, and C-DF33 may be 120 Hz.

The driving controller 100 may compare the initial count Ki of compensation frames C-DF11, C-DF12, C-DF13, C-DF21, C-DF22, C-DF23, C-DF31, C-DF32, and C-DF33 with the predetermined count threshold N_th. In an embodiment of the present disclosure, when the initial count Ki is 9 in the case where the count threshold N_th is set to 5, the final count Kf of compensation frames positioned between the previous driving frame P-DF and the target driving frame T-DF needs to be adjusted to an even number. Here, because the initial count Ki of compensation frames C-DF11, C-DF12, C-DF13, C-DF21, C-DF22, C-DF23, C-DF31, C-DF32, and C-DF33 is an odd number of 9, the driving controller 100 may set the final count Kf to an even number (e.g., 8 or 10) by adjusting the initial count Ki. In an embodiment, for example, the driving controller 100 may adjust the final count Kf of the compensation frames to 8 by removing the compensation frame C-DF33 or may adjust the final count Kf of the compensation frames to 10 by adding one compensation frame.

In FIG. 7B, an x-axis represents the initial count Ki of compensation frames, and a y-axis represents a contrast threshold. As shown in FIG. 7B, it may be seen that the flashing level appears relatively low when the initial count Ki of compensation frames is 1 or 3 (i.e., an odd number) that is less than 5 in the case where the count threshold N_th is set to 5. Here, as the contrast threshold is close to 1, a flashing level decreases. As the contrast threshold is closer to 0 than 1, a flashing level increases. Moreover, it may be seen that the flashing level appears relatively low when the initial count Ki of compensation frames is 6, 8, 10, or 12 (i.e., an even number) that is greater than 5 in the case where the count threshold N_th is set to 5.

Figure 8:
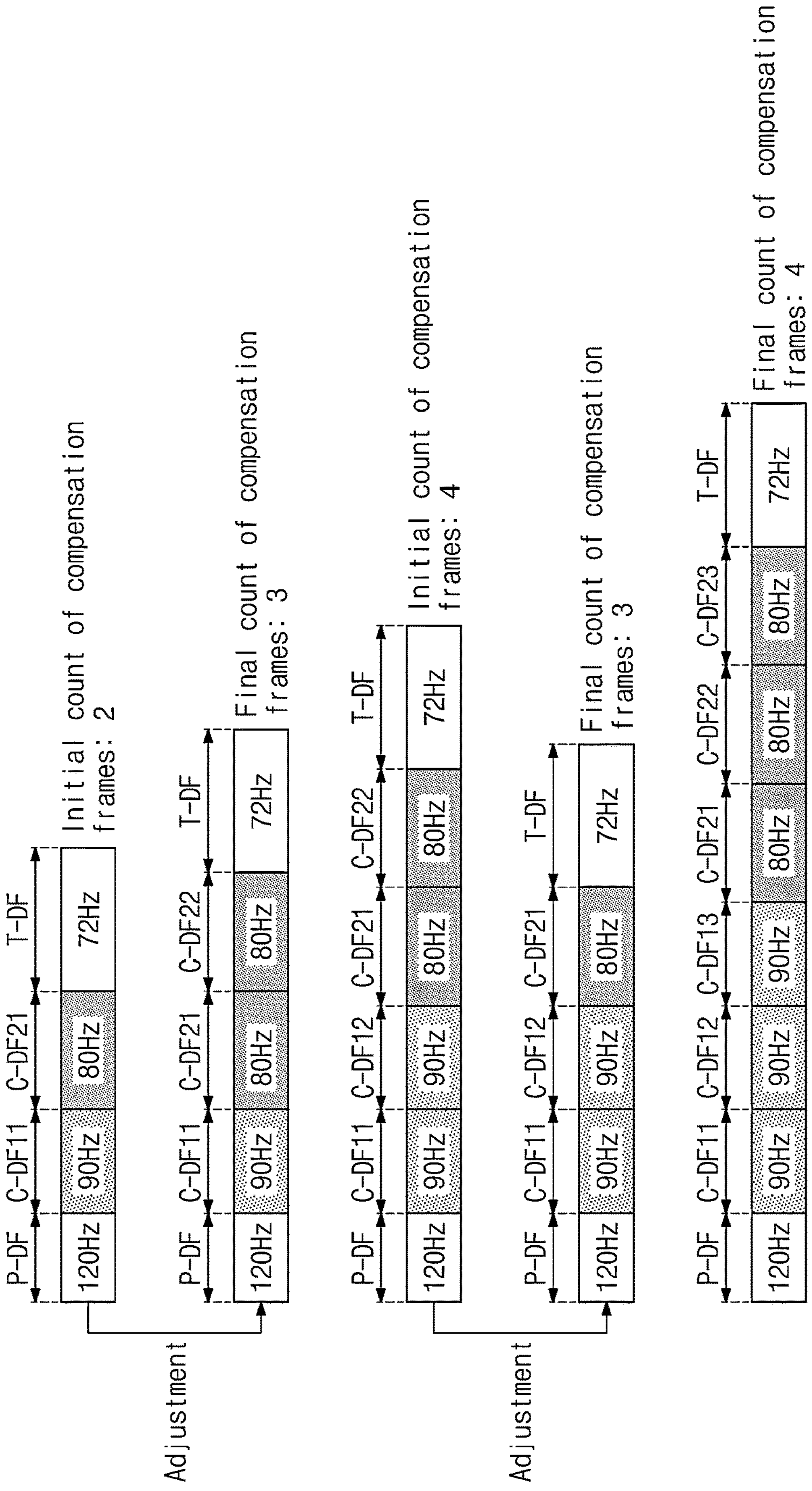
FIG. 8 is a diagram illustrating a process of adjusting the number of compensation frames, according to an embodiment of the present disclosure.

FIG. 8 is a diagram illustrating a process of adjusting the initial count of compensation frames, according to an embodiment of the present disclosure.

Referring to FIGS. 4A, 4B, and 8, when a previous refresh rate of the previous driving frame P-DF is 120 Hz and a target refresh rate T_RR of the target driving frame T-DF is 72 Hz, a difference value between the previous refresh rate (i.e., 120 Hz) and the target refresh rate T_RR (i.e., 72 Hz) may be 48 Hz. In this case, a reference value may be calculated as 30 Hz by multiplying the previous refresh rate (i.e., 120 Hz) by a predetermined reference percentage (e.g., about 25%). Because the difference value is greater than or equal to the reference value, the driving controller 100 may determine to insert compensation frames C-DF11 and C-DF21 between the previous driving frame P-DF and the target driving frame T-DF. In an embodiment of the present disclosure, the driving controller 100 may set the initial count Ki of compensation frames C-DF11 and C-DF21 to two and may set the compensation refresh rates of the compensation frames C-DF11 and C-DF21 to 90 Hz and 80 Hz, respectively.

The driving controller 100 may compare the initial count Ki of compensation frames C-DF11 and C-DF21 with the predetermined count threshold N_th. In an embodiment of the present disclosure, when the initial count Ki is 2 in the case where the count threshold N_th is set to 5, the final count Kf of compensation frames positioned between the previous driving frame P-DF and the target driving frame T-DF needs to be adjusted to an odd number. Here, because the initial count Ki of compensation frames C-DF11 and C-DF21 is an even number of 2, the driving controller 100 may set the final count Kf to an odd number (e.g., 1 or 3) by adjusting the initial count Ki. In an embodiment, for example, the driving controller 100 may adjust the final count Kf of the at least one compensation frame to 3 by adding the compensation frame C-DF22 or may adjust the final count Kf of the at least one compensation frame to 1 by deleting the one compensation frame C-DF21.

In an embodiment of the present disclosure, the driving controller 100 may determine to insert four compensation frames C-DF11, C-DF12, C-DF21, and C-DF22 between the previous driving frame P-DF and the target driving frame T-DF. Among the four compensation frames C-DF11, C-DF12, C-DF21, and C-DF22, the first compensation refresh rate of each of the compensation frames C-DF11 and C-DF12 (i.e., first compensation frames) may be 90 Hz and the second compensation refresh rate of each of the compensation frames C-DF21 and C-DF22 (i.e., second compensation frames) may be 80 Hz.

The driving controller 100 may compare the initial count Ki of compensation frames C-DF11, C-DF12, C-DF21, and C-DF22 with the predetermined count threshold N_th. In an embodiment of the present disclosure, when the initial count Ki is 4 in the case where the count threshold N_th is set to 5, the final count Kf of compensation frames positioned between the previous driving frame P-DF and the target driving frame T-DF needs to be adjusted to an odd number. Here, because the initial count Ki of compensation frames C-DF11, C-DF12, C-DF21, and C-DF22 is an even number of 4, the driving controller 100 may set the final count Kf to an odd number (e.g., 3 or 5) by adjusting the initial count Ki. In an embodiment, for example, the driving controller 100 may adjust the final count Kf of the compensation frames to 3 by removing the compensation frame C-DF22.

In an embodiment of the present disclosure, the driving controller 100 may determine to insert six compensation frames C-DF11, C-DF12, C-DF13, C-DF21, C-DF22, and C-DF23 between the previous driving frame P-DF and the target driving frame T-DF. Among the four compensation frames C-DF11, C-DF12, C-DF13, C-DF21, C-DF22, and C-DF23, the first compensation refresh rate of each of the first compensation frames C-DF11, C-DF12, and C-DF13 may be 90 Hz; and, the second compensation refresh rate of each of the second compensation frames C-DF21, C-DF22, and C-DF23 may be 80 Hz.

The driving controller 100 may compare the initial count Ki of compensation frames C-DF11, C-DF12, C-DF13, C-DF21, C-DF22, and C-DF23 with the predetermined count threshold N_th. In an embodiment of the present disclosure, when the initial count Ki is 6 in the case where the count threshold N_th is set to 5, the final count Kf of compensation frames positioned between the previous driving frame P-DF and the target driving frame T-DF needs to be adjusted to an even number. Here, because the initial count Ki of the compensation frames C-DF11, C-DF12, C-DF13, C-DF21, C-DF22, and C-DF23 is 6, which is already an even number, the driving controller 100 may set the initial count Ki to the final count Kf without adjustment.

Figure 9A:
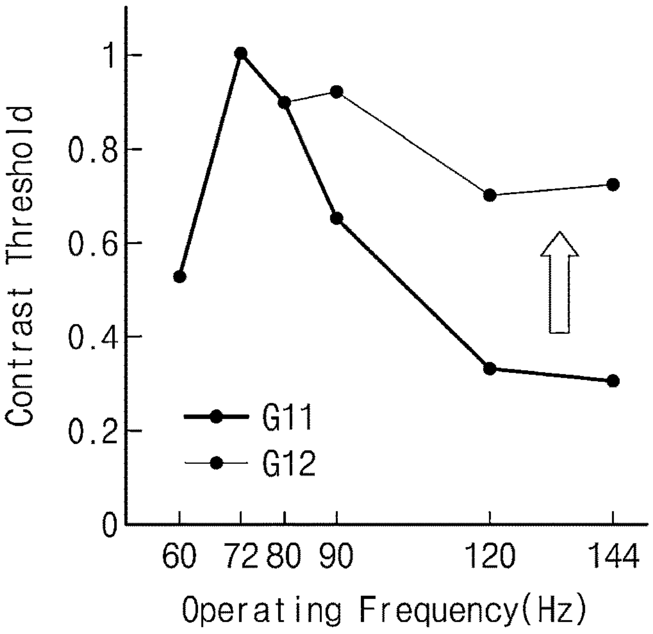
FIG. 9A is a graph showing a state in which a flashing level is improved by adjusting the number of compensation frames through a process shown in FIG. 7A.
Figure 9B:
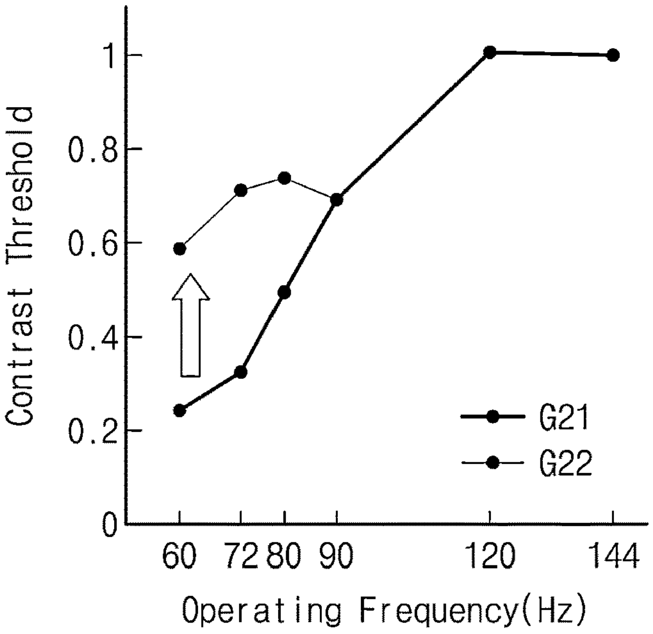
FIG. 9B is a graph showing a state in which a flashing level is improved by adjusting the number of compensation frames through a process shown in FIG. 8.

FIG. 9A is a graph showing a state in which a flashing level is improved by adjusting the initial count of compensation frames through a process shown in FIG. 7A. FIG. 9B is a graph showing a state in which a flashing level is improved by adjusting the initial count of compensation frames through a process shown in FIG. 8. In FIGS. 9A and 9B, an x-axis represents an operating frequency, and a y-axis represents a contrast threshold. In particular, FIG. 9A shows a case where a previous refresh rate is 72 Hz, and FIG. 9B shows a case where the previous refresh rate is 120 Hz. In FIGS. 9A and 9B, when an initial count Ki is not adjusted depending on the result of comparing a count threshold N_th with the initial count Ki, first and third graphs G11 and G21 represent flashing levels. When the initial count Ki is adjusted depending on the result of comparing the count threshold N_th with the initial count Ki, second and fourth graphs G12 and G22 represent flashing levels.

Referring to FIG. 9A, it has been measured that a flashing level appeared high in the case where the initial count Ki of compensation frames is not adjusted when a previous refresh rate (e.g., 72 Hz) is changed to a target refresh rate (e.g., 90 Hz, 120 Hz, or 144 Hz). However, it is indicated that the flashing level is lower than before when the previous refresh rate is changed to the target refresh rate (e.g., 90 Hz, 120 Hz or 144 Hz) by adjusting the initial count to an even number or an odd number depending on the result of comparing the count threshold N_th with the initial count Ki. In particular, even though the previous refresh rate is changed to the target refresh rate (e.g., 120 Hz or 144 Hz) having the difference value is greater than a reference value generated by multiplying the previous refresh rate (e.g., 72 Hz) by a predetermined reference percentage (e.g., about 25%), it is indicated that the contrast threshold is not less than about 0.6. Accordingly, it is indicated that flashing does not occur in a variable frequency mode, and thus the overall image quality of a display device is effectively improved.

Referring to FIG. 9B, it has been measured that a flashing level appeared high in the case where the initial count Ki of compensation frames is not adjusted when a previous refresh rate (e.g., 120 Hz) is changed to a target refresh rate (e.g., 90 Hz, 80 Hz, 72 Hz, or 60 Hz). However, it is indicated that the flashing level is lower than before when the previous refresh rate is changed to the target refresh rate (e.g., 90 Hz, 80 Hz, 72 Hz, or 60 Hz) by adjusting the initial count Ki to an even number or an odd number depending on the result of comparing the count threshold N_th with the initial count Ki. In particular, even though the previous refresh rate is changed to the target refresh rate (e.g., 72 Hz or 60 Hz) having the difference value is greater than a reference value generated by multiplying the previous refresh rate (e.g., 120 Hz) by a predetermined reference percentage (e.g., about 25%), it is indicated that the contrast threshold is not less than about 0.6. Accordingly, it is indicated that flashing does not occur in a variable frequency mode, and thus the overall image quality of a display device is effectively improved.

As used in connection with various embodiments of the disclosure, each of the refresh rate checker 101, the gray checker 102, the comparator 105, the determiner 107, the threshold determining unit 1071, the initial count setting unit 1072, and the final count setting unit 1073 may be implemented in hardware, software, or firmware, for example, implemented in a form of an application-specific integrated circuit (ASIC).

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, flicker may be suppressed by inserting a compensation frame between a previous driving frame and a target driving frame in a variable frequency mode and comparing and adjusting an initial count of the inserted compensation frame with a count threshold. As a result, the overall image quality of a display device may be effectively improved.

Moreover, image quality delay may be preventing from occurring in a video by preventing unnecessary compensation from being performed when there is no need to insert a compensation frame (i.e., when a difference between a previous refresh rate and a target refresh rate is less than a reference value).

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels; and a panel driver configured to drive the display panel at a target refresh rate different from a previous refresh rate, wherein the panel driver includes:

a comparator configured to compare a difference value between the previous refresh rate and the target refresh rate with a reference value generated by multiplying the previous refresh rate by a predetermined reference percentage; and a determiner configured to determine a final count of at least one compensation frame to be inserted between a previous driving frame operating at the previous refresh rate and a target driving frame operating at the target refresh rate when the difference value is not less than the reference value, wherein the final count is a total number of the at least one compensation frame, and a natural number, wherein each of the at least one compensation frame has a compensation refresh rate between the previous refresh rate and the target refresh rate, and wherein the compensation refresh rate is set such that a difference value between the compensation refresh rate and the previous refresh rate is less than or equal to the reference value.

2. The display device of claim 1, wherein the at least one compensation frame includes:

at least one first compensation frame operating at a first compensation refresh rate; and at least one second compensation frame following the first compensation frame and operating at a second compensation refresh rate different from the first compensation refresh rate.

3. The display device of claim 2, wherein the first compensation refresh rate is set such that a difference value between the first compensation refresh rate and the previous refresh rate is less than or equal to the reference value, and wherein the second compensation refresh rate is set such that a difference value between the second compensation refresh rate and the first compensation refresh rate is less than or equal to an additional reference value generated by multiplying the first compensation refresh rate by the reference percentage.

4. The display device of claim 1, wherein the reference percentage is about 25%.

5. The display device of claim 1, wherein the determiner includes:

an initial count setting unit configured to compare a predetermined flashing threshold with flashing information and to set an initial count of the at least one compensation frame depending on a result of the comparison between the predetermined flashing threshold and the flashing information; and a final count setting unit configured to compare the initial count with a predetermined count threshold and to adjust the initial count to the final count depending on a result of the comparison between the initial count and the predetermined count threshold.

6. The display device of claim 5, wherein the final count setting unit sets the final count to an odd number by adjusting the initial count when the initial count is less than the predetermined count threshold, and sets the final count to an even number by adjusting the initial count when the initial count is not less than the predetermined count threshold.

7. The display device of claim 6, wherein the final count setting unit sets the final count to the odd number by increasing or decreasing the initial count when the initial count is less than the predetermined count threshold and the initial count is an even number, and sets the initial count as the final count when the initial count is less than the predetermined count threshold and the initial count is an odd number.

8. The display device of claim 6, wherein the final count setting unit sets the final count to the even number by increasing or decreasing the initial count when the initial count is not less than the predetermined count threshold and the initial count is an odd number, and sets the initial count as the final count when the initial count is not less than the predetermined count threshold and the initial count is an even number.

9. The display device of claim 5, wherein the predetermined count threshold is 4 or 5.

10. The display device of claim 5, wherein the determiner further includes:

a threshold determining unit configured to determine the flashing threshold based on grayscale information and the target refresh rate.

11. The display device of claim 1, wherein, when the difference value is less than the reference value, the determiner does not insert the at least one compensation frame between the previous driving frame and the target driving frame.

12. The display device of claim 1, wherein the compensation refresh rate is set such that a difference between the compensation refresh rate and the previous refresh rate is less than or equal to the reference value generated by multiplying the reference percentage by the previous refresh rate.

13. The display device of claim 1, wherein the panel driver includes:

a data driver configured to output data signals to the display panel; and a driving controller configured to control driving of the data driver, and wherein the driving controller includes the comparator and the determiner.

14. The display device of claim 13, wherein the driving controller further includes:

a refresh rate checker configured to calculate the target refresh rate based on an input image signal and a control signal, wherein the comparator receives the target refresh rate from the refresh rate checker, and wherein the previous refresh rate is stored in the comparator in advance before the target refresh rate is calculated.

15. A display device comprising:

a display panel including a plurality of pixels;

a data driver configured to output data signals to the display panel; and a driving controller configured to control driving of the data driver and to receive an input image signal at a target refresh rate different from a previous refresh rate, wherein the driving controller includes:

a comparator configured to compare a difference value between the previous refresh rate and the target refresh rate with a reference value generated by multiplying the previous refresh rate by a predetermined reference percentage;

an initial count setting unit configured to compare a predetermined flashing threshold with flashing information and to set an initial count of at least one compensation frame to be inserted between a previous driving frame operating at the previous refresh rate and a target driving frame operating at the target refresh rate depending on a result of the comparison between the predetermined flashing threshold and the flashing information, when the difference value is not less than the reference value; and a final count setting unit configured to compare the initial count with a predetermined count threshold and to adjust the initial count to a final count depending on a result of the comparison between the initial count and the predetermined count threshold, wherein the final count is a total number of the at least one compensation frame, and a natural number.

16. The display device of claim 15, wherein the final count setting unit sets the final count to an odd number by adjusting the initial count when the initial count is less than the predetermined count threshold, and sets the final count to an even number by adjusting the initial count when the initial count is not less than the predetermined count threshold.

17. The display device of claim 16, wherein the final count setting unit sets the final count to the odd number by increasing or decreasing the initial count when the initial count is less than the predetermined count threshold and the initial count is an even number, and sets the initial count as the final count when the initial count is less than the predetermined count threshold and the initial count is the odd number.

18. The display device of claim 16, wherein the final count setting unit sets the final count to the even number by increasing or decreasing the initial count when the initial count is not less than the predetermined count threshold and the initial count is an odd number, and sets the initial count as the final count when the initial count is not less than the predetermined count threshold and the initial count is an even number.

19. The display device of claim 15, wherein each of the at least one compensation frame has a compensation refresh rate between the previous refresh rate and the target refresh rate, and wherein the compensation refresh rate is set such that a difference value between the compensation refresh rate and the previous refresh rate is less than or equal to the reference value.

20. An electronic device comprising a display device, the display device comprising:

a display panel including a plurality of pixels; and a panel driver configured to drive the display panel at a target refresh rate different from a previous refresh rate, wherein the panel driver includes:

a comparator configured to compare a difference value between the previous refresh rate and the target refresh rate with a reference value generated by multiplying the previous refresh rate by a predetermined reference percentage; and a determiner configured to determine a final count of at least one compensation frame to be inserted between a previous driving frame operating at the previous refresh rate and a target driving frame operating at the target refresh rate when the difference value is not less than the reference value, wherein the final count is a total number of the at least one compensation frame, and a natural number, wherein each of the at least one compensation frame has a compensation refresh rate between the previous refresh rate and the target refresh rate, and wherein the compensation refresh rate is set such that a difference value between the compensation refresh rate and the previous refresh rate is less than or equal to the reference value.

* * * * *